US008996155B2

(12) United States Patent
Hiller et al.

(10) Patent No.: US 8,996,155 B2
(45) Date of Patent: Mar. 31, 2015

(54) APPARATUS AND METHODS FOR DIGITAL MANUFACTURING

(75) Inventors: Jonathan D. Hiller, Ithaca, NY (US); Hod Lipson, Ithaca, NY (US)

(73) Assignee: Cornell University, Ithaca, NY (US)

( * ) Notice: Subject to any disclaimer, the term of this patent is extended or adjusted under 35 U.S.C. 154(b) by 416 days.

(21) Appl. No.: 13/055,614

(22) PCT Filed: Jul. 24, 2009

(86) PCT No.: PCT/US2009/051671
§ 371 (c)(1),
(2), (4) Date: Feb. 10, 2011

(87) PCT Pub. No.: WO2010/011911
PCT Pub. Date: Jan. 28, 2010

(65) Prior Publication Data
US 2011/0123794 A1 May 26, 2011

Related U.S. Application Data

(60) Provisional application No. 61/137,008, filed on Jul. 25, 2008.

(51) Int. Cl.
*G06F 19/00* (2011.01)
*B29C 67/00* (2006.01)

(52) U.S. Cl.
CPC .................................. *B29C 67/0059* (2013.01)
USPC .............................................. 700/118; 700/95

(58) Field of Classification Search
USPC ......... 700/95, 117, 118, 119; 29/428; 118/58, 118/620; 156/378, 379.6
See application file for complete search history.

(56) References Cited

U.S. PATENT DOCUMENTS

| 5,003,692 A | 4/1991 | Izumi et al. |
| 5,594,652 A * | 1/1997 | Penn et al. ..................... 700/119 |

(Continued)

FOREIGN PATENT DOCUMENTS

| CN | 1758256 A | 4/2006 |
| WO | 0245203 A1 | 6/2002 |

(Continued)

OTHER PUBLICATIONS

International Search Report dated May 26, 2010 for PCT/US09/51671.

(Continued)

*Primary Examiner* — Charles Kasenge
(74) *Attorney, Agent, or Firm* — Burns & Levinson LLP; Orlando Lopez

(57) ABSTRACT

A method for manufacturing objects/materials includes selectively arranging the predetermined components in a staging area, substantially simultaneously selectively removing two or more of the selectively arranged predetermined components according to a predetermined removal plan and substantially simultaneously placing the selectively removed components, the removed components being substantially simultaneously placed at a predetermined location. A system for practicing the method includes a supply of the predetermined components, an arranging subsystem receiving the predetermined components and arranging the predetermined components according to a predetermined arrangement, a selective removal subsystem for selectively removing at least two of the selectively arranged predetermined components, the selectively removing occurring substantially simultaneously and according to a predetermined removal prescription, and a placement subsystem for substantially simultaneously placing the selectively removed components at a predetermined location.

44 Claims, 14 Drawing Sheets

(56) References Cited

U.S. PATENT DOCUMENTS

| | | | |
|---|---|---|---|
| 5,659,477 A | 8/1997 | Collins | |
| 6,175,422 B1 | 1/2001 | Penn et al. | |
| 6,417,025 B1 | 7/2002 | Gengel | |
| 6,623,007 B2 | 9/2003 | Logue | |
| 6,623,687 B1 | 9/2003 | Gervasi et al. | |
| 6,831,640 B2* | 12/2004 | Shih et al. | 345/419 |
| 6,997,698 B2* | 2/2006 | Silverbrook | 425/375 |
| 7,037,382 B2 | 5/2006 | Davidson et al. | |
| 7,102,635 B2* | 9/2006 | Shih et al. | 345/419 |
| 7,122,057 B2* | 10/2006 | Beam et al. | 623/23.51 |
| 7,144,242 B2* | 12/2006 | Silverbrook | 425/375 |
| 7,146,236 B2* | 12/2006 | Silverbrook | 700/118 |
| 7,162,324 B2* | 1/2007 | Silverbrook | 700/119 |
| 7,162,325 B2* | 1/2007 | Silverbrook | 700/119 |
| 7,195,475 B2* | 3/2007 | Silverbrook | 425/375 |
| 7,206,654 B2* | 4/2007 | Silverbrook | 700/119 |
| 7,220,112 B2* | 5/2007 | Silverbrook | 425/174.4 |
| 7,220,115 B2* | 5/2007 | Silverbrook | 425/375 |
| 7,231,275 B2* | 6/2007 | Silverbrook | 700/119 |
| 7,231,276 B2* | 6/2007 | Silverbrook | 700/119 |
| 7,389,154 B2* | 6/2008 | Hunter et al. | 700/119 |
| 7,435,075 B2* | 10/2008 | Peng et al. | 425/394 |
| 7,435,368 B2* | 10/2008 | Davidson et al. | 264/113 |
| 7,500,846 B2* | 3/2009 | Eshed et al. | 425/375 |
| 7,556,329 B2* | 7/2009 | Silverbrook | 347/13 |
| 7,625,512 B2* | 12/2009 | Cruz-Uribe et al. | 264/308 |
| 7,762,814 B2* | 7/2010 | van der Zel | 433/201.1 |
| 7,815,826 B2* | 10/2010 | Serdy et al. | 264/49 |
| 8,289,274 B2* | 10/2012 | Sliwa et al. | 345/108 |
| 8,429,174 B2* | 4/2013 | Ramani et al. | 707/749 |
| 2002/0062909 A1 | 5/2002 | Jang et al. | |
| 2002/0064745 A1* | 5/2002 | Schulman et al. | 433/2 |
| 2003/0065400 A1* | 4/2003 | Beam et al. | 623/23.51 |
| 2003/0198677 A1* | 10/2003 | Pryce Lewis et al. | 424/471 |
| 2004/0005182 A1 | 1/2004 | Gaylo et al. | |
| 2004/0012112 A1* | 1/2004 | Davidson et al. | 264/109 |
| 2004/0026031 A1 | 2/2004 | Smith et al. | |
| 2004/0239009 A1* | 12/2004 | Collins et al. | 264/497 |
| 2005/0023719 A1* | 2/2005 | Nielsen et al. | 264/162 |
| 2005/0074511 A1* | 4/2005 | Oriakhi et al. | 425/174.4 |
| 2005/0074596 A1* | 4/2005 | Nielsen et al. | 428/304.4 |
| 2005/0104241 A1 | 5/2005 | Kritchman et al. | |
| 2005/0154481 A1* | 7/2005 | Berger et al. | 700/98 |
| 2005/0173838 A1 | 8/2005 | Priedeman, Jr. et al. | |
| 2005/0179167 A1 | 8/2005 | Hachikian | |
| 2005/0202660 A1 | 9/2005 | Cohen et al. | |
| 2006/0141145 A1* | 6/2006 | Davidson et al. | 427/203 |
| 2006/0156978 A1* | 7/2006 | Lipson et al. | 118/708 |
| 2006/0160250 A1* | 7/2006 | Bonassar et al. | 438/1 |
| 2007/0087071 A1* | 4/2007 | Devos et al. | 425/375 |
| 2007/0092654 A1 | 4/2007 | Smith et al. | |
| 2008/0006334 A1* | 1/2008 | Davidson et al. | 137/571 |
| 2008/0006958 A1* | 1/2008 | Davidson | 264/101 |
| 2008/0047628 A1* | 2/2008 | Davidson et al. | 141/18 |
| 2008/0060330 A1* | 3/2008 | Davidson et al. | 55/529 |
| 2008/0109103 A1 | 5/2008 | Gershenfeld et al. | |
| 2008/0220061 A1* | 9/2008 | Pryce Lewis et al. | 424/471 |
| 2008/0246761 A1 | 10/2008 | Faken et al. | |

FOREIGN PATENT DOCUMENTS

| | | |
|---|---|---|
| WO | 2006052955 A2 | 5/2006 |
| WO | 2008097329 A2 | 8/2008 |

OTHER PUBLICATIONS

Park, S. H. et al. Direct Fabrication of Micropatterns and Three-Dimensional Structures Using Nanoreplication-Printing (nRP) Process. Sensors and Materials 17(2), 2005, pp. 65-75.

Greiner, A. et al. Capillary Forces in Micro-Fluidic Self-Assembly. Technical Proceedings of the 2002 International Conference on Modeling and Simulation of Microsystems, Nanotech 2002 vol. I, Chapter 4: Optimization, Co-Simulation, pp. 198-201.

Saeedi, E. et al. Molten-Alloy Driven Self-Assembly for Nano and Micro Scale System Integration. FDMP 2(4), 2006, pp. 221-245.

Popescu, G. A. Digital Materials for Digital Fabrication. Master of Science Thesis submitted Sep. 2007 at the Massachusetts Institute of Technology, pp. 1-53.

Popescu, G. A. et al. Digital Materials. Draft paper submitted Apr. 13, 2009 for Massachusetts Institutute of Technology Course No. MAS 961 "How to Make Something That Makes (almost) Anything," pp. 1-12.

* cited by examiner

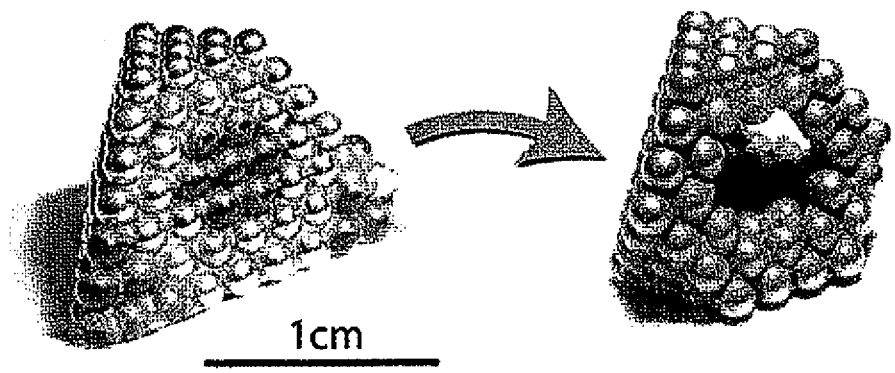
Fig. 3a　　　　　　　　　　　Fig. 3b
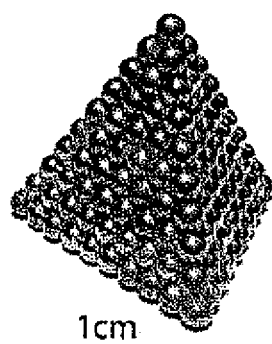　　　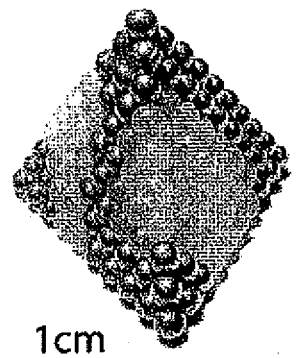
Fig. 3c　　　　　　　　　　　Fig. 3d

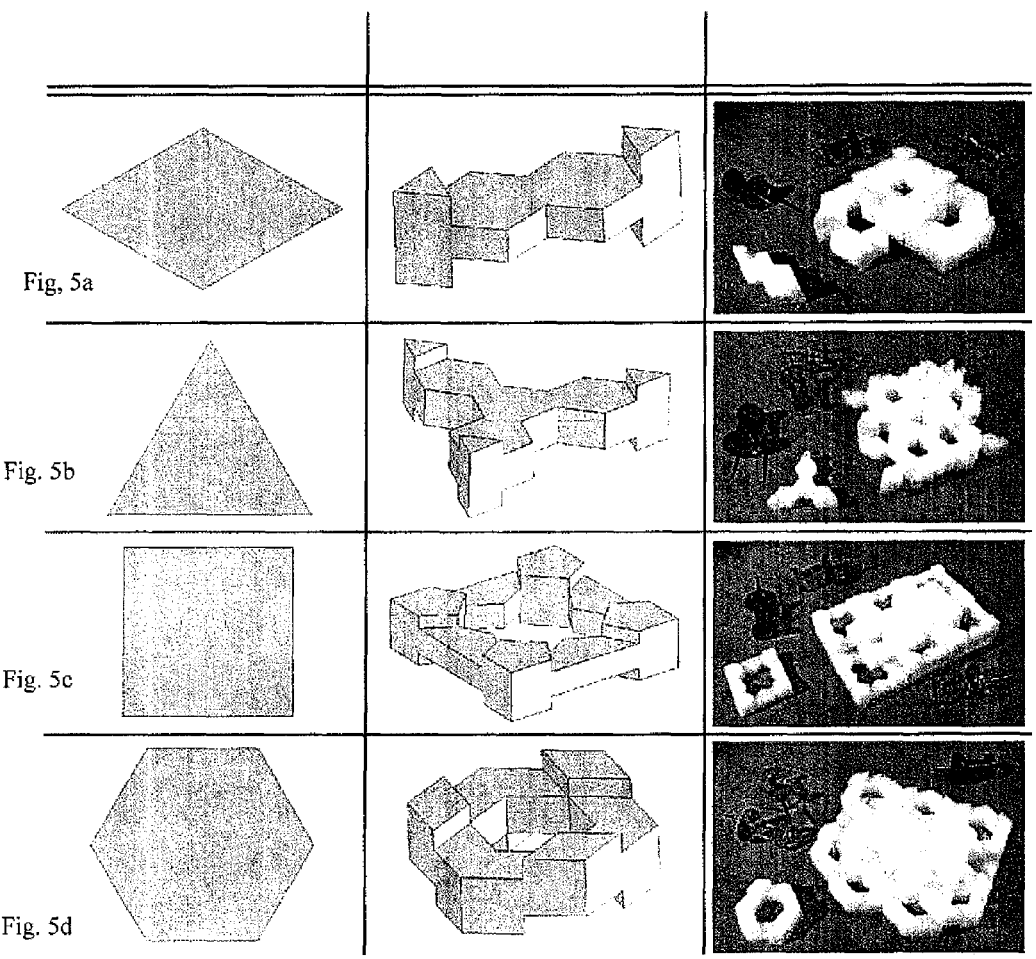

APPARATUS AND METHODS FOR DIGITAL MANUFACTURING

CROSS REFERENCE TO RELATED APPLICATIONS

The present application is the U.S. national phase entry under 35 U.S.C. §371 of International Application No. PCT/US09/51671 filed Jul. 24, 2009 entitled APPARATUS AND METHODS FOR DIGITAL MANUFACTURING, which in turn claims priority to U.S. Provisional Application Ser. No. 61/137,008 filed Jul. 25, 2008 entitled APPARATUS FOR DIGITAL MANUFACTURING AND METHOD OF USING, both of which are incorporated by reference herein in their entirety for all purposes.

STATEMENT REGARDING FEDERALLY SPONSORED RESEARCH OR DEVELOPMENT

This invention was made with United States government support from the Defense Advanced Research Projects Agency (DARPA), under Contract Number W911NF-07-1-0298. The United States Government has certain rights in the invention.

BACKGROUND

These teachings relate generally to manufacturing objects/materials, and, more particularly, to digital manufacturing.

Most conventional manufacturing techniques can be considered analog since the conventional manufacturing techniques are practically continuous, their substructure cannot be arbitrarily specified and accuracies lost with each measurement and subsequent application.

Conventional three-dimensional printing processes are generally material-dependent and irreversible. Typically, conventional three-dimensional digital printers use continuous materials, with the digital specification being imposed by external logic. Conventional 3-dimensional fabrication is either additive or subtractive. Additive conventional three-dimensional printers work by depositing and/or bonding amorphous materials together in a way that results in a three-dimensional structure. Subtractive three-dimensional fabrication, such as with lathes or CNC milling machines, works by removing material from a block of bulk material. These techniques use complex control systems in order to precisely position the working tool in order to accurately build the desired object. The substrates, typically powders and binders for additive processes, or blocks of raw material for subtractive processes, define the material and surface properties of the final product, but not its shape.

Existing Freeform Fabrication is mainly Analog Additive 3D Printing, as most existing assemblers build structures by dispensing small amounts of one or two different materials as droplets of very precise size and in very precise location. Most existing commercial free-form fabrication printers build by putting together small quantities of no more than a few expensive materials. In order to make high-resolution objects, they need to be very precise, and therefore they cost between tens and hundreds of thousands of dollars and must be operated by skilled technicians.

Existing technology in this field typically employs one of several processes. In one method, a component is constructed by depositing a first layer of a fluent porous material or porous solid. Next, a binder material is deposited to selected regions to produce a layer of material. A second method consists of incorporating a movable dispensing head provided with a supply of material which solidifies at a predetermined temperature or when exposed to light or UV light. Instead of dispensing drops, other apparatuses place a filament at the desired position then heat it to convert a portion of the filament to a flowable fluid that is solidified in that position. A third approach comprises fabricating a three-dimensional object from individual layers of fabrication material having a predetermined configuration. Successive layers are stacked in a predetermined sequence and fixed together to form the object. Refinements include producing parts from two distinct classes of materials, where the first class of material forms a three-dimensional shape defined by the interface of the first class of material and the second class of material.

Recent manufacturing techniques such as bottom-up self assembly offer some of the benefits of digital matter in their ability to spontaneously assemble materials guided by local interactions between components; however, self-assembled processes can be difficult to control and are generally limited to regular, semi-periodic or random structures. Top-down deterministic pick-and-place approaches offer precise control over production and are useful where a small number of components are assembled in specific ways. However, top-down methods of assembly are limited in their throughput and at small scales are often limited to two dimensions. Attempts have been made to reconcile different modes of assembly such as hierarchical, directed, and templated self assembly. Recent rapid-prototyping technologies based on selective curing have opened the door to top-down fabrication of arbitrarily complex geometries, but cannot handle prefabricated building blocks; as a result, they are limited to a small set of homogeneous materials with mutually compatible rheological properties.

A digital assembler for creating three-dimensional objects from digital materials where a new line is fed to the assembly head and added to the structure has been described but such a technique is limited in its throughput. There is a need for a digital manufacturing system capable of faster throughput and capable of scale up while still obtaining an accurate output.

BRIEF SUMMARY

In one embodiment, the method for manufacturing object/materials of these teachings includes (a) arranging, in a predetermined arrangement, predetermined components in a predetermined area, (b) selectively removing at least two of the arranged predetermined components, the selectively removing occurring substantially simultaneously and according to a predetermined removal prescription, and (c) substantially simultaneously placing the selectively removed components at a predetermined location according to a predetermined placement prescription. In one instance, steps (a)-(c) are repeated until the object/material is manufactured.

In one embodiment, the system for manufacturing object/materials of these teachings includes a component arranging subsystem receiving a number of components and arranging the received components in a feeder area, one location in an arrangement corresponding to a location of one component, an assembly head including a printhead structural subsystem having a number of selectively activatable locations on one surface, each selectively activatable location corresponding to a location in the arrangement; upon activation, one component is operatively attached to one selectively activated location upon disposing the printhead structural subsystem on the arranged components; the operatively attached component being removed from the arrangement upon displacement of the printhead structural subsystem away from the feeder area; and an activating subsystem for selectively activating locations from the number of selectively activatable locations. In that embodiment, the system also includes a motion control component controlling motion of the printhead structural subsystem, the motion comprising disposing the printhead structural subsystem on the arranged components, displacing the printhead structural subsystem away from the feeder area and placing the printhead structural subsystem at location on a build stage.

In one embodiment of the system of these teaching, the printhead includes a printhead structural component; a surface of the printhead structural component having a plurality of selectively activatable locations, each corresponding to a location in an arrangement; a wetting component for substantially uniformly wetting selectively activatable location with a predetermined solution, the predetermined solution being selected in order to operatively attach a component to a substantially uniformly wetted selectively activatable location upon disposing the surface on an arranged plurality of components, and a controllable drying component for selectively drying predetermined selectively activatable locations, the predetermined selectively activatable locations corresponding to a predetermined component removal prescription.

For a better understanding of the present teachings, together with other and further objects thereof, reference is made to the accompanying drawings and detailed description and its scope will be pointed out in the appended claims.

BRIEF DESCRIPTION OF THE DRAWINGS

FIGS. 3a-3d are exemplary objects manufactured by an embodiment of the method of these teachings;

FIGS. 5a-5i are exemplary embodiments of voxels (physical instantiations of 3D pixels-components) utilized in embodiments of the system of these teachings;

DETAILED DESCRIPTION

Embodiments of digital manufacturing systems and methods are disclosed herein below. Voxel or component, as used herein, refers to a physical instantiation of a three-dimensional pixel or basic digital building block.

Figure 1A:
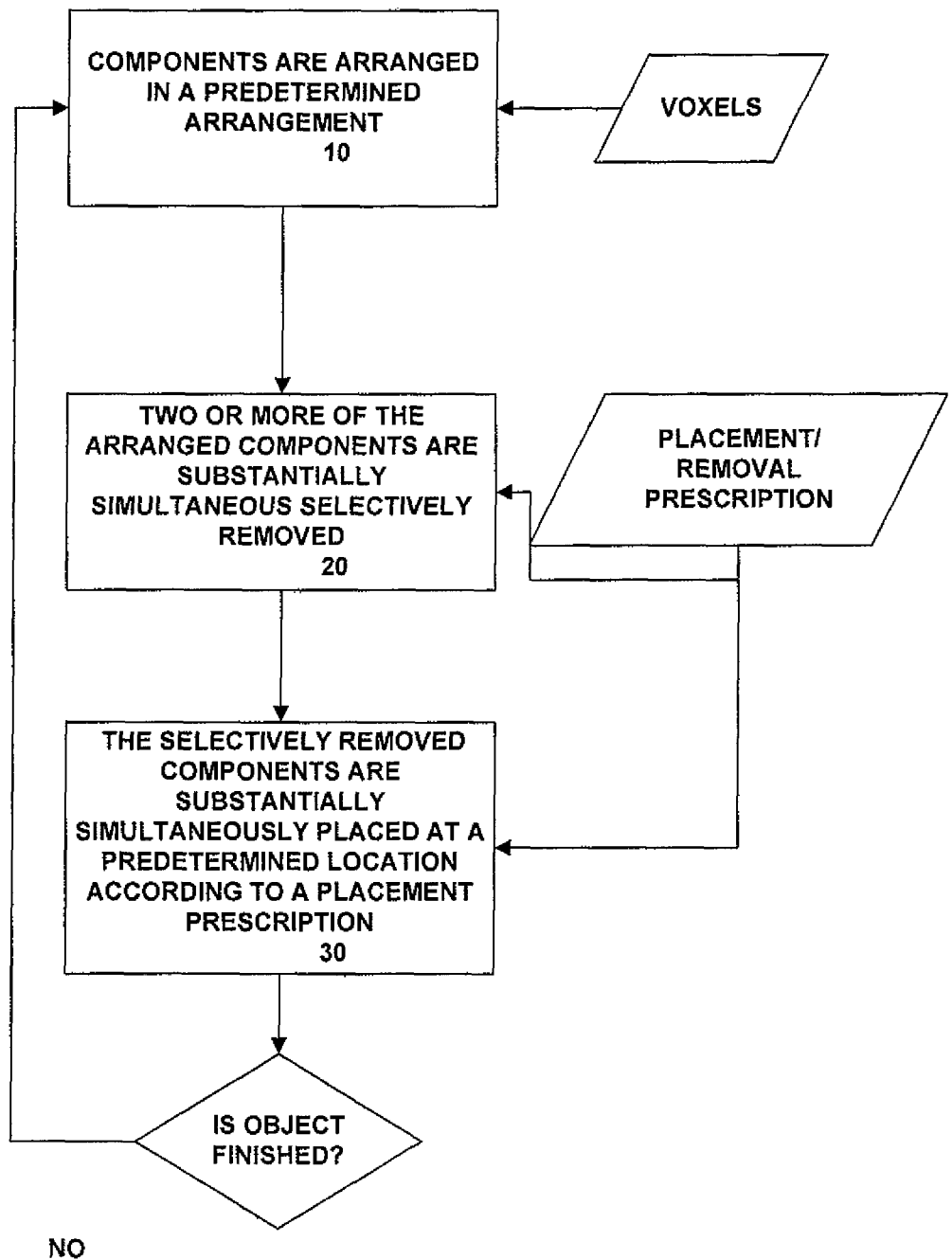
FIGS. 1a, 1b are flowchart representations of embodiments of the method of these teachings.

FIG. 1a shows a flowchart of one embodiment of the method of these teachings. Referring to FIG. 1a, components (voxels) are provided and the components are arranged in a predetermined arrangement at a predetermined area (step 10). Two or more of the arranged components are selectively removed, the removal occurring substantially simultaneously and according to a predetermined removal prescription (step 20). The selectively removed components are substantially simultaneously placed at predetermined locations according to a predetermined placement prescription (step 30). If the object/material has not been completed, steps 10 through 30 are repeated.

When the removal/placement prescription requires removing/placing only one component, only one component is removed from the arrangement and only one component is placed at the location in the staging area. In one instance the arranging of the components (Voxels) is accomplished by self-assembly. In one embodiment, self-assembly is obtained by means of gravity and vibration. It should be noted that other methods of self-assembly are within the scope of these teachings. For example, methods such as, but not limited to, self-assembly by means of capillary forces (see for example, Uthara Srinivasan, Dorian Liepmann, and Roger T. Howe, Microstructure to Substrate Self-Assembly Using Capillary Forces, Journal of Microelectromechanical Systems, Vol. 10, No. 1, March 2001; Smith, J. S, High density, low parasitic direct integration by fluidic self assembly (FSA), 2000. IEDM Technical Digest. International Electron Devices Meeting, 2000, Pages: 201-204, U.S. Patent Publication Number 20070092654, all of which are incorporated by reference herein in their entirety) or electrostatic forces (see, for example, Joe Tien, Andreas Terfort, and George M. Whitesides, Microfabrication through Electrostatic Self-Assembly, *Langmuir* 1997, 13, 5349-5355, which is incorporated by reference herein in its entirety) can also be used.

It should be noted that other methods of arranging components, such as, but not limited to, manual placing, placing by means of a pick and place robot, settling of components into area indentations, floating components over capillary attraction point, or hopper feeds into a conveyor belt, are within the scope of these teachings.

Although in the exemplary embodiment disclosed herein the components are substantially spherical components, a variety of other component shapes are within the scope of these teachings. In some embodiments, the components (voxels) can include, but are not limited to, cylindrical components (2.5 D components) having a cross-sectional area selected from an equilateral triangle, a rectangle, a diamond, a hexagon, an irregular two-dimensional and tessellating shape, and interlocking areas comprised of a combination of the above, and 3-D components such as, but not limited to, a rectangular prism, a truncated tetrahedron or a truncated octahedron.

In some instances, the arranging of the components, and/or the selective removing of the two or more of the arranged components and/or the substantially simultaneous placing of the selectively removed components is monitored in order to ensure correct performance.

In some embodiments, components of another type are also utilized. In a group of embodiments, the components of the other type are sacrificial components. In those embodiments, an arrangement of the sacrificial components is obtained (either after or in parallel with arranging a group of the components that will stay in the object). After obtaining an arrangement of sacrificial components, steps 20 and 30 of FIG. 1a are performed for the arrangement of sacrificial components. After the object is completely assembled, the sacrificial components are removed. Removal of the sacrificial components can be accomplished, for example, these teachings not be limited to only those examples, by selecting sacrificial components having a lower melt temperatures than the normal components and raising the temperature the finished object above the melt temperature of the sacrificial components, by selecting sacrificial components that can be dissolved by a particular solvent while the normal components are not dissolved by that solvent, by selecting sacrificial components that do not attach securely to other components when a particular binder is used while the normal components attach securely when that particular binder is used and applying a shaking force to loosen and remove the sacrificial components. It should be noted that other methods of removing the sacrificial components are within the scope of these teachings.

Figure 1B:
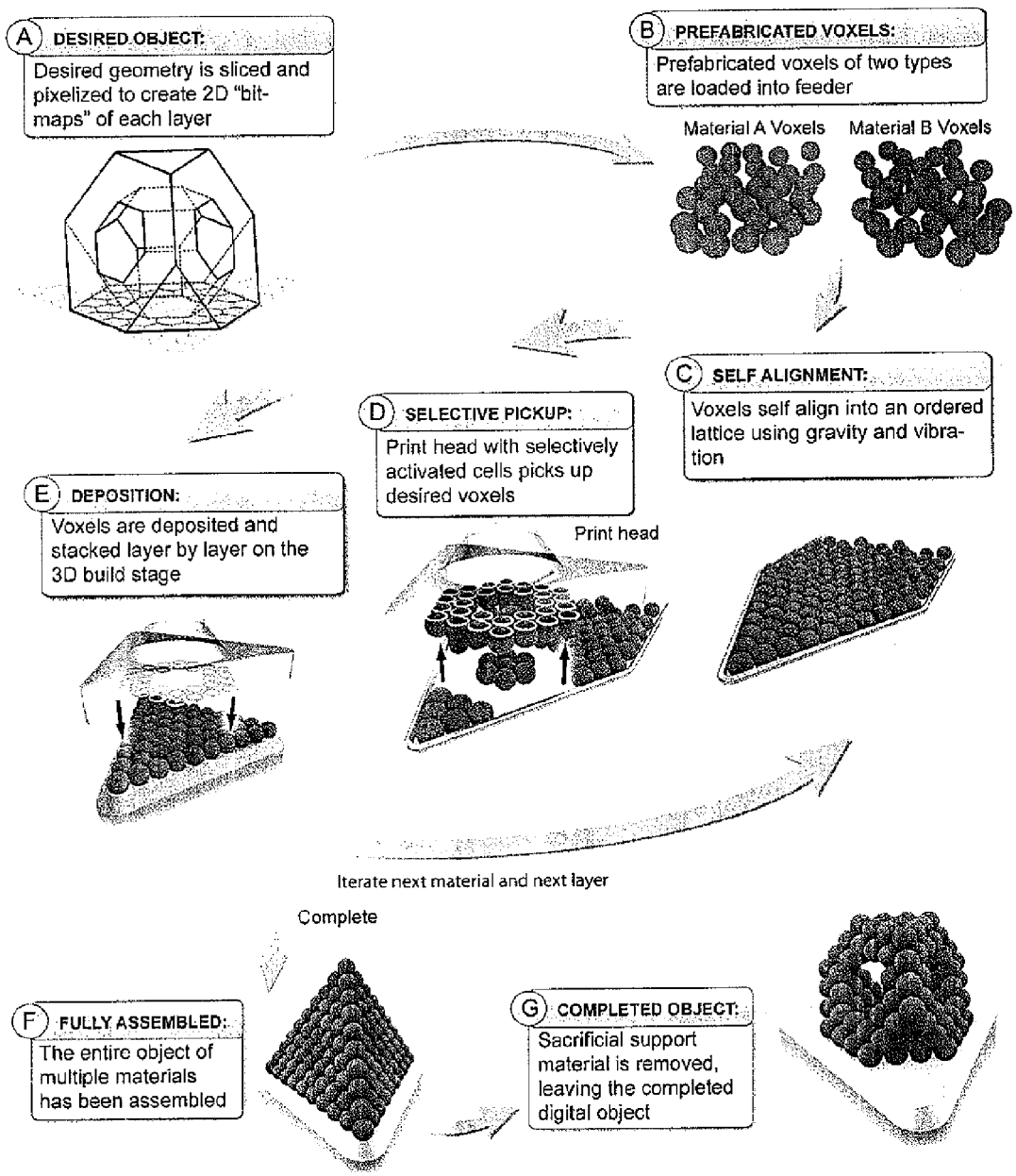
Figure 2A:
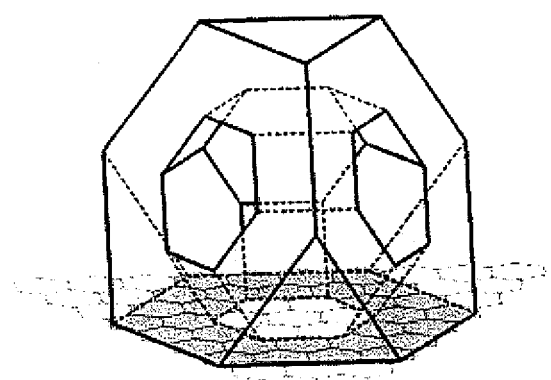
FIGS. 2a-2g depict exemplary results obtained from practicing an embodiment of the method of these teaching.
Figure 2B:
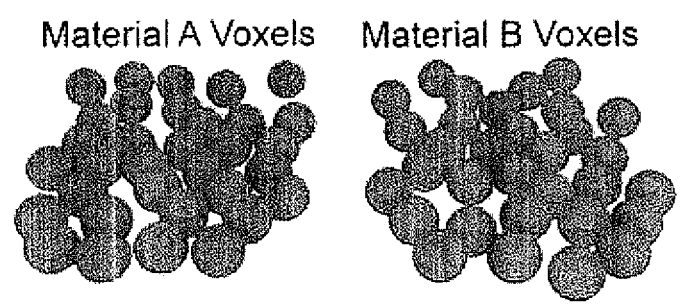
Figure 2C:
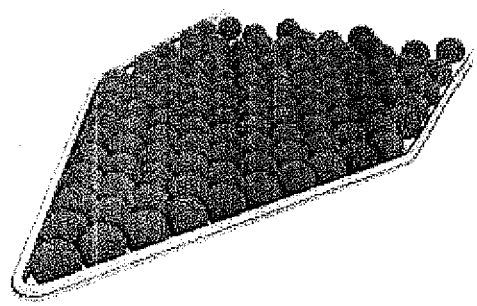
Figure 2D:
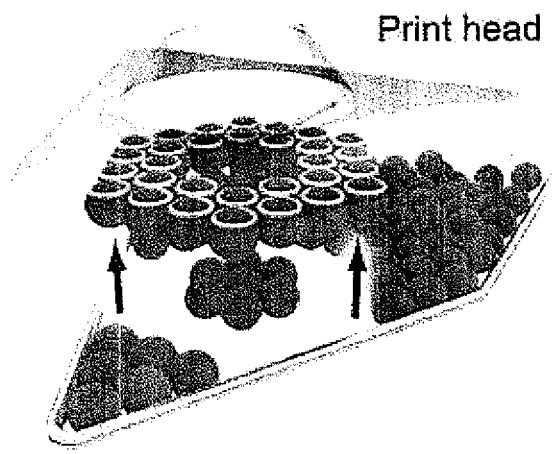
Figure 2E:
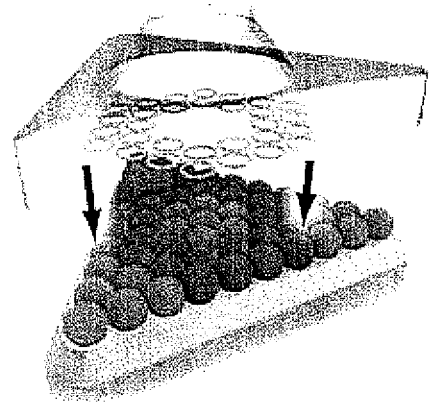
Figure 2F:
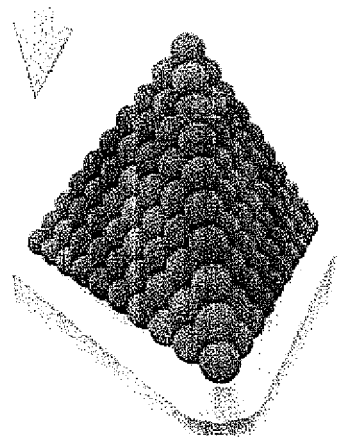
Figure 2G:
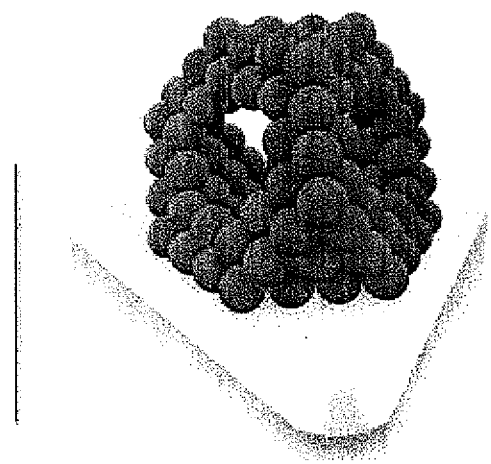

FIG. 1b shows a flowchart of another embodiment of the method of these teachings. Referring to FIG. 1b, a target blueprint of an object or material to be manufactured is converted into a series of bitmaps (FIG. 2a) describing the existence or absence of a particular voxel type in each layer (providing a placement/removal prescription), (step B). Prefabricated voxels of multiple materials (FIG. 2b) are poured into feeders and (step C) are arranged (in one embodiment, voxels of a single material self-align using gravity and vibration in the tray) into an ordered lattice for each of the materials (FIG. 2c) (step D). A selectively activated deposition tool substantially simultaneously picks up selected voxels from an entire layer, the ordered lattice, of voxels (FIG. 2d), according to the bitmaps, and deposits them on the build stage (FIG. 2e) (step E). Steps C through E are repeated for each material of each layer. Once the entire object (FIG. 2f) is assembled (step F), if sacrificial voxels are used, sacrificial support material is removed to create freeform geometry (FIG. 2g).

At various steps in the process, the process is monitored in order to determine proper performance. In one instance, the arranging of the predetermined components, the voxels of one material type, is monitored. In another instance, the substantially simultaneous selective removing of the at least two voxels of one material type from the arrangement is monitored. In yet another instance, the substantially simultaneous placing of the removed voxels of one material type is monitored.

The placing (also referred to as depositing, of the selected components, in one instance, occurs by deactivating the mechanism that allows picking up the selected components. After the activation, the selected components are deposited at the build stage, the first group of components to be deposited being deposited on the stage, the next group of components being deposited on the previously deposited group. In one instance, the deactivation occurs by dispensing a binder at the location on the build stage for the components are going to be deposited. Upon, after placing the assembly (pickup) head at the build stage and removing the assembly (pickup) head away from the build stage, components that are operatively attached to the assembly head are detached and deposited.

In one embodiment, the object/material being manufactured will consist of multiple types of components in multiple layers. There can be any number of different types of components and each layer can consist of one or more of the multiple types of components. The object/material being manufactured will consist of a predetermined number of layers, and there can be any number of layers. The composition of each layer can be different. Steps 10-30 (FIG. 1) are repeated a number of times, the number of times being equal to at most the number of types of components. After each layer is completed, the position of the predetermined location is adjusted to a position appropriate for the manufacture of the next layer of the object/material. Then the steps 10-30 and the step of adjusting the position of the predetermined location are repeated a number of times equal to the number of layers in the object/material being manufactured FIGS. 3a-3d are exemplary objects manufactured by an embodiment of the method of these teachings.

In one embodiment, the system of these teachings includes a component arranging subsystem receiving a number of components of one material type and arranging the components in a feeder area, one location in an arrangement corresponding to a location of one component from the arrangement of components, an assembly head having a printhead structural subsystem, one surface of the printhead structural subsystem (the surface that will be disposed on the arrangement of components) having a plurality of selectively activatable locations, each selectively activatable location corresponding to a location in the arrangement of components. Upon activation, one component from the number of components (voxels) can be operatively attached to one selectively activated location upon disposing the printhead structural subsystem on the arrangement of components; the operatively attached component being removed from the arrangement upon displacement of the printhead structural subsystem away from the feeder area. The assembly head also includes an activating subsystem for selectively activating locations from the number of selectively activatable locations. The above embodiment of the system of these teachings also includes a motion control subsystem controlling motion of the printhead structural subsystem where the motion includes disposing the printhead structural subsystem on the components, displacing the printhead structural subsystem away from the feeder area and placing the printhead structural subsystem at location on a build stage. In one instance, the embodiment of the system of these teachings also includes a deactivating subsystem. The deactivating subsystem, after the printhead structural subsystem has been placed at the location on the build stage, detaches components operatively attached to the printhead structural subsystem and deposits the detached components on the location at the build stage.

In one instance, these teachings not being limited to that instance, the deactivating subsystem includes a binder dispensing component dispensing binder on the location at the build stage; wherein, after placing the assembly head at the location on the build stage, upon removing the printhead structural subsystem away from the build stage, components operatively attached to the printhead structural subsystem are detached from the printhead structural subsystem and deposited on the location at the build stage.

In another instance, these teachings not being limited to that instance, each component in the number of components is an interlocking component. After placing the printhead structural subsystem at the location on the build stage, components operatively attached to the printhead structural subsystem interlock with components already disposed on the build stage, the interlocking detaching the operatively attached components. Upon removing the printhead structural subsystem away from the build stage, the detached components are deposited on the build stage.

In one embodiment, these teachings not being limited to that embodiment, the component arranging subsystem includes a feeder receptacle receiving the components (voxels) and a vibration generating component vibrating the feeder receptacle after receiving the components. In one instance, the feeder receptacle is inclined in order to utilize both gravity and vibration for self-assembly of the arrangement.

It should be noted that component arranging subsystem utilizing other methods of self-assembly are within the scope of these teachings. For example, component arranging subsystems utilizing methods such as, but not limited to, self-assembly by means of capillary forces or self-assembly by means of electrostatic forces are within the scope of these teachings.

It should also be noted that component arranging subsystems utilizing other methods of arranging components, such as, but not limited to, manual placing, placing by means of a pick and place robot, settling of components into area indentations, floating components over capillary attraction point, or hopper feeds into a conveyor belt, are within the scope of these teachings.

In one embodiment, the assembly head (also referred to as the printhead) includes a printhead structural component, a surface of the printhead structural component having the number of selectively activatable locations, each selectively activatable location being an area corresponding to a location in the arrangement of components. In that embodiment, the assembly head also includes a wetting subsystem and a drying subsystem. The wetting subsystem substantially uniformly wets each area with a predetermined fluid, the predetermined fluid being selected in order to operatively attach a component to a substantially uniformly wetted area upon disposing the surface on the components. The controllable drying subsystem selectively dries predetermined areas, the predetermined areas corresponding to a predetermined component removal prescription. In one instance, the predetermined fluid comprises water and detergent. It should be noted that "fluid" as used herein includes gels and that other fluids are within the scope of these teachings.

In one instance, the controllable drying subsystem includes an optical system projecting onto the surface of the assembly head an image corresponding to the non-removal areas in the predetermined component removal prescription. An electromagnetic radiation source provides a source for the optical system, a wavelength and intensity of the source being selected in order to substantially dry the predetermined areas corresponding to the predetermined component removal prescription. It should be noted that the activatable areas may be indented areas.

In another embodiment, the assembly head (also referred to as the printhead) includes a printhead structural component, a surface of the printhead structural subsystem having a number of selectively activatable locations, each selectively activatable location corresponding to a location in the arrangement of voxels and a charging subsystem substantially providing an electrical charge to predetermined ones of the selectively activatable locations.

In one instance, the charging subsystem includes a corona charging subsystem provides an ionized stream providing electrical charge and a selective blocking/discharging subsystem preventing electrical charging of predetermined selectively activatable locations. In one instance, the selective blocking/discharging subsystem includes a mask providing a physical barrier between predetermined selectively activatable locations and the ionized stream, the physical barrier preventing electrical charging of predetermined selectively activatable locations. In another instance, the charging subsystem includes an optical subsystem providing electromagnetic radiation directed at predetermined selectively activatable locations, the selectively activatable location being comprised of a material that discharges upon illumination by electromagnetic radiation of a predetermined wavelength/intensity.

In one embodiment, each component (voxel) comprises a substantially spherical component. In another embodiment, each component (voxel) may be a cylindrical component having a cross-sectional area selected from an equilateral triangle, a rectangle, a diamond, a hexagon, an irregular two-dimensional and tessellating shape, and an interlocking area comprised of a combination of the above, a rectangular prism, a truncated tetrahedron or a truncated octahedron.

Figure 4:
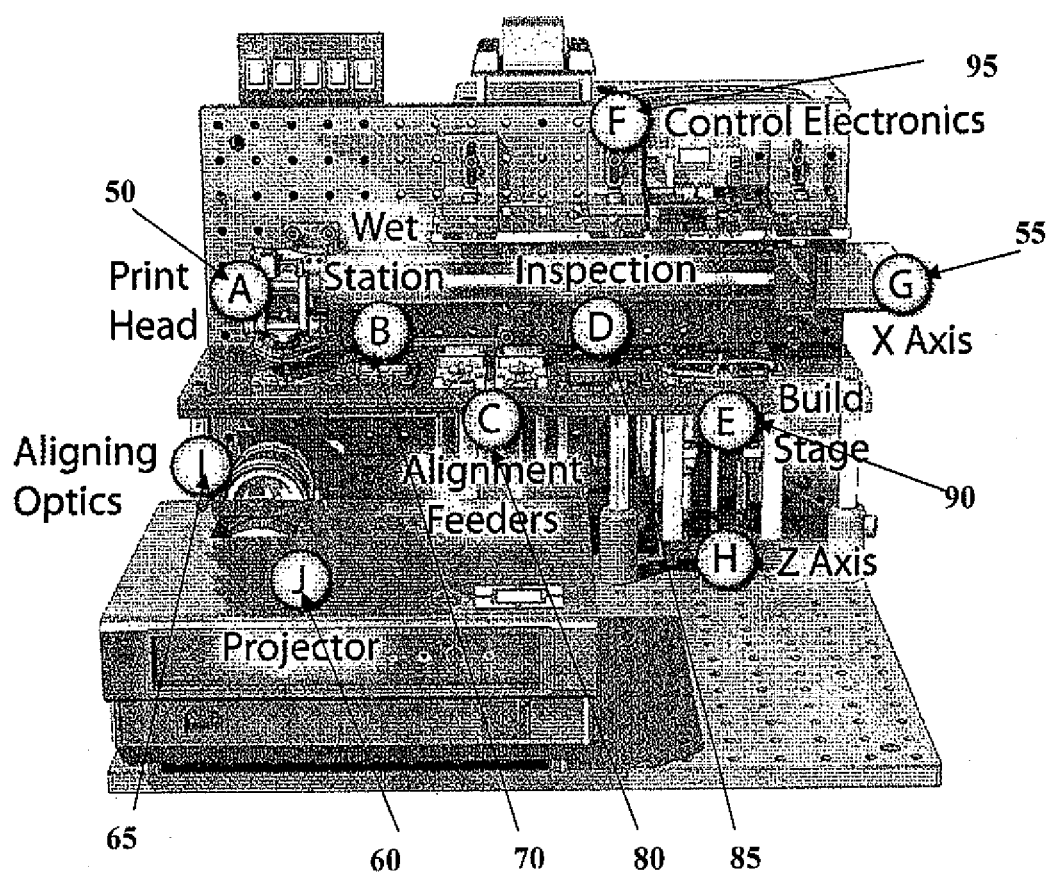
FIG. 4 is a graphical schematic representation of an embodiment of the system of these teachings.

In order to better illustrate these teachings, several exemplary embodiments are disclosed hereinbelow. FIG. 4 shows a schematic diagram of an embodiment utilizing spherical voxels and a printhead utilizing a wetting subsystem. The print head (50) moves back and forth on the X Axis of motion (55). A projector (60) shining through focusing optics (70) dries the print head selectively. A wet station (75) allows the entire head to be wetted while alignment feeders (80) align and hold layers of voxels for pickup. After an inspection station (85) each layer is deposited on the build stage (90) which moves along the Z axis of motion. Control electronics (95) direct the entire process.

The deposition print head 50 moves to a series of stations (B-E) on the X axis degree of freedom 55. Station A is the exposure station, where the selective drying takes place from a pattern of light generated by the projector 60 and scaled through a series of lenses 65. A camera underneath monitors the drying process in real time. Station B is the wet station 70, where, in this exemplary embodiment, the entire surface of the print head is immersed in a solution of water and detergent before selective drying takes place. The stations at C are the material feeders 80. Raw materials (spheres) are poured into the hoppers in the back, and each of the two feeders inclines, in this exemplary embodiment, approximately 3 degrees. (It should be noted that specific numerical values and properties are provided for the exemplary embodiment are not a limitation of these teachings.) Pager motors (generating mechanical vibration) are embedded in each feeder and vibrate to settle the spheres into the positions of lowest energy, which corresponds to a close packed lattice. The ability to selectively pick up voxels at arbitrary locations within a pre-aligned layer is useful in the substantially simultaneous assembly process. A camera is mounted beneath each feeder, which have transparent bases so that the camera can monitor the position of each sphere in real time using machine vision techniques. The inspection station 85 also contains a camera underneath which inspects the deposition head before and after depositing the spheres on the build stage 90. This allows indirect verification of spheres that were actually deposited. The build stage simply holds the part being assembled, and moves down on the Z axis degree of freedom (H) as subsequent layers are stacked up. Control electronics 95 provide, in one instance, a USB interface (other interfaces and embodiments are within the scope of these teachings) to the master computer that controls the slave microcontrollers in charge of the motion systems and camera image acquisition.

Although the above exemplary embodiment of the system of these teachings and the embodiments shown in FIGS. 2a-2f utilize spherical components (voxels), the specific component utilized is not a limitation of these teachings. FIGS. 5a-5i illustrate an exemplary variety of components (voxels) that may be utilized (but it should be noted again that the exemplary variety of voxels shown therein is not a limitation of these teachings).

The operation of the exemplary embodiment shown in FIG. 4 is disclosed hereinbelow. The digital object is first expressed in a blueprint made up of a series of binary bitmaps that correspond to successive layers of the physical materials that will be printed. Each bit in the bitmap signals the existence or absence of a specific physical voxel type in a specific layer in the target object (FIG. 2a). Prefabricated voxels of the appropriate types are then dispensed into the material feeders trays (FIG. 2b). Next, voxels of a single material self-align using gravity and vibration in the tray (FIG. 2c). The spheres are settled until they reach a perfect 2D hexagonal arrangement. In one instance, not a limitation of these teachings, spherical about 1.5 mm diameter voxels are placed in 55-unit triangular trays. In the exemplary embodiment, two types of spheres of different materials are separately aligned. The fabrication process of these teachings is extendable to larger layers, smaller voxels, and to any number of materials.

Figures 6A, 6B, 6C, 6D:
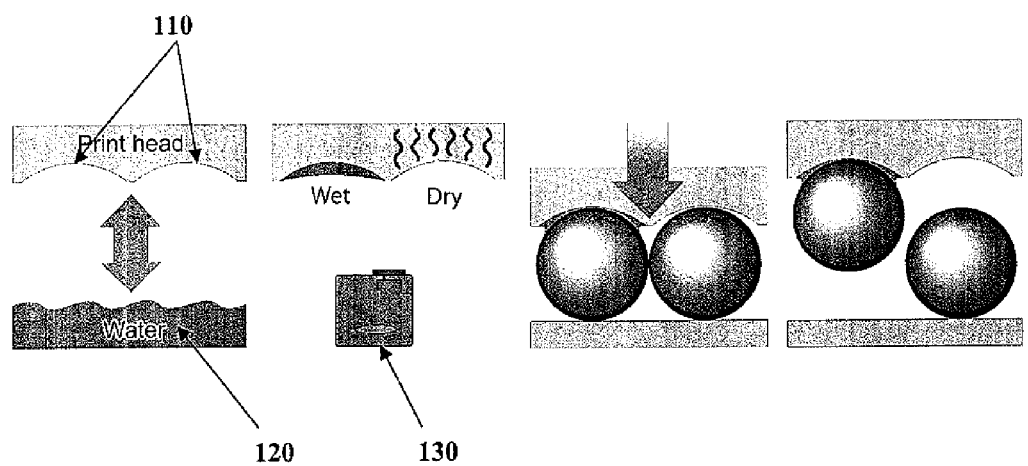
FIGS. 6a-6d are graphical schematic representations of the operation of one embodiment of the printhead of these teachings.

Each layer of the matrix is then printed and stacked in turn, as follows. Once a uniform layer of a single material has been self-aligned (FIG. 2c), in the exemplary embodiment, a parallel capillary opto-fluidic effect is applied to selectively pick up voxels specified by the electronic bitmap (FIG. 2d) through a process of selective wetting. First, a flat print head containing a pattern of activatable locations (110, FIG. 6a) corresponding to lattice position. In the embodiment shown in FIGS. 6a-6d, each activatable location is an indented area and is uniformly wetted (FIG. 6a) by immersing the surface having the pattern of activatable locations 110 into a wetting subsystem 120. In one instance, a solution of water mixed with detergent is used as the wetting fluid. (It should be noted that other fluids, including gels, are within the scope of these teachings.) The fluid utilized for wetting is selected to enable favorable wetting characteristics. The bitmap of voxels is then transformed into a black and white image of a pattern of dots that each coincide with a cell on the print head. Using appropriate optics, this image is then projected onto the infrared absorbing deposition head using, in the exemplary embodiment, a DLP projector 130 (an exemplary embodiment of an optical system) with high infra-red emitting mercury arc lamp (an exemplary embodiment of an electromagnetic radiation source). It should be noted that other optical systems and electromagnetic radiation sources are within the scope of these teachings. The desired pattern of cells is dried (in one exemplary embodiment, not a limitation of these teachings, in approximately 45 seconds), leaving the remainder of the cells wet, or activated.

To deposit the voxels (FIG. 2d) the selectively-wetted print head presses down onto the aligned spheres. The water in the active indentations wets around the perimeter of its respective sphere, holding it in place by surface tension. The deposition head then lifts and carries only these selected spheres to the build stage. A liquid polyvinyl acetate binder was used to temporarily bind the structure together during the build process. The layer of binder is spread on the existing printed object, and the current layer is deposited. Each sphere falls into the interstitial region of the three spheres below it and is held by the adhesive properties of the binder as the deposition head moves away.

Figure 7E:
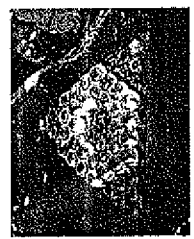
FIGS. 7a-7e are graphical representations of an exemplary embodiment of operation of one embodiment of the printhead of these teachings.
Figure 7D:
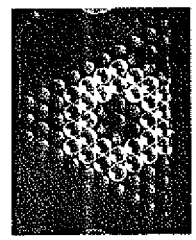
Figure 7C:
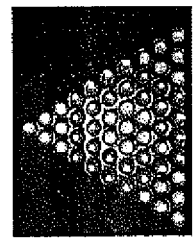
Figure 7B:
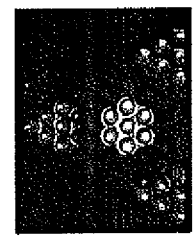
Figure 7A:
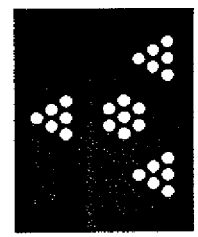

In a specific example shown in FIGS. 7a-7e, a pattern of dots is selected (FIG. 7a), drying those cells on the print head (FIG. 7b) leaving the other wet, or active (FIG. 7c). The voxels are lifted (FIG. 7d) and placed on the build stage (FIG. 7e).

Figure 8:
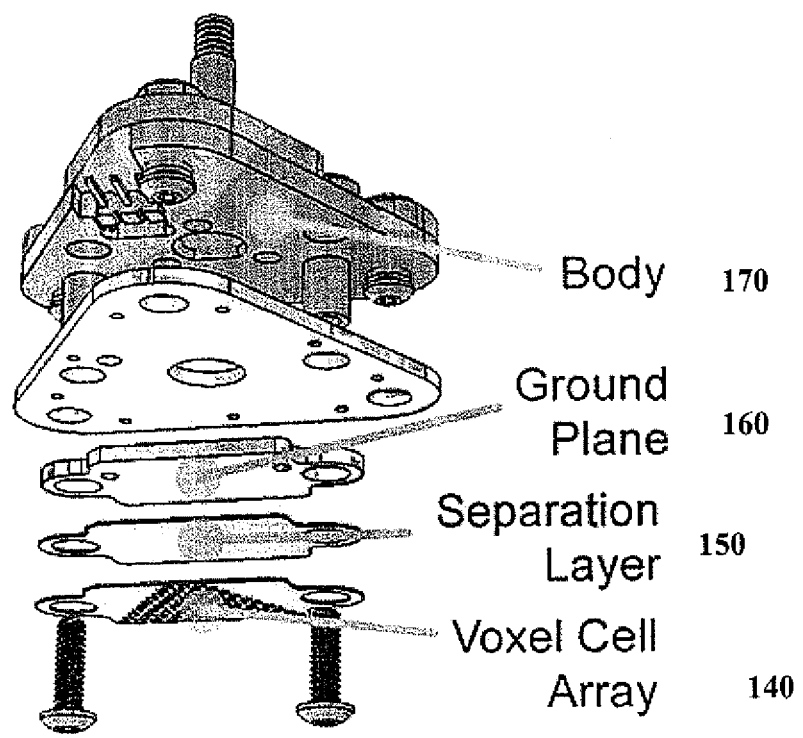
FIG. 8 is a graphical schematic representation of another embodiment of the printhead of these teachings.

Another embodiment of the print head of these teachings is disclosed hereinbelow. Referring to FIG. 8, a surface of the structural subsystem of the printhead has a number of selectively activatable locations 140, each selectively activatable location corresponding to a location in the arrangement of the voxels. The structural subsystem also includes, in the embodiment shown in FIG. 8, a separation layer 150 which may either insulate or conduct charge to the ground plane, a ground plane 160, and a rigid body 170 for mounting the head to an X-Z stage. The printhead system also includes a charging subsystem (180, FIG. 9) substantially providing an electrical charge to predetermined ones of the selectively activatable locations and selective blocking/discharging subsystem preventing electrical charging of predetermined selectively activatable locations.

In one instance, the charging subsystem 180 includes a corona charging subsystem providing an ionized stream providing electrical charge and a selective blocking/discharging subsystem preventing electrical charging of predetermined selectively activatable locations. In one instance, a corona wire is used to impart a static charge on the print head surface. To obtain a selective charge, a physical barrier is placed between the desired cells and the corona emitter.

In another instance (not shown), the selective blocking/discharging subsystem includes an optical subsystem providing electromagnetic radiation directed at predetermined selectively activatable locations, the selectively activatable location being comprised of a material that discharges upon illumination by electromagnetic radiation of a predetermined wavelength/intensity (such as, but not limited to, selenium).

Figure 9:
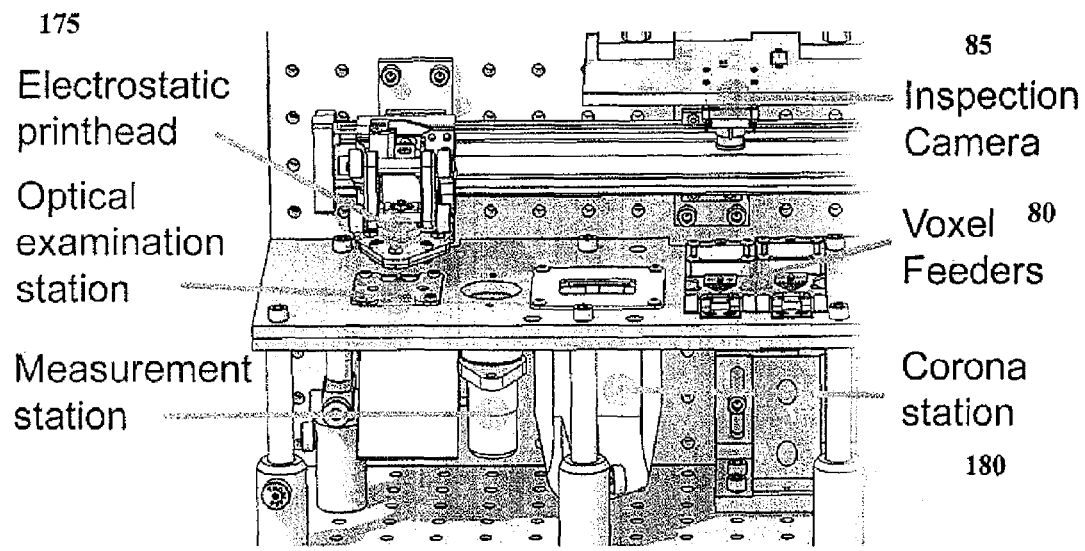
FIG. 9 is a graphical schematic representation of another embodiment of the system of these teachings.

FIG. 9 shows a schematic diagram of an exemplary embodiment of the system of these teachings where the printhead utilizes electrostatic charging. Referring to FIG. 9, the printhead structural subsystem 175 moves to the static charge station 180 where a corona wire, in the embodiment shown (other embodiment being within the scope of these teachings), housed below emits a stream of ions to impart a static charge to the voxel array (140, FIG. 8) of the printhead structural subsystem.

In the exemplary embodiments shown in FIG. 4 and FIG. 9, monitoring subsystems are utilized. The monitoring subsystems are utilized, for example, but not limited to, to monitor the arranging of the components (voxels), to monitor the removing of operatively attached components and to monitor the placing of the detached components. In one instance, the self alignment of the voxels in the feeders is monitored in closed loop by machine vision, utilizing conventional machine vision systems. In one instance, in the self alignment process in the exemplary embodiments, machine vision is important to ensure that each sphere has assumed a distinct position within the lattice. Errors are characterized, and can be accounted for in software or the entire process retried.

In another instance, in the exemplary embodiments, the self alignment process can then be carried out in closed loop. The feeder is inclined and vibrated, then a frame is captured and analyzed. When all spheres are within some threshold of optimal lattice positions, the algorithm exits. Otherwise the algorithm chooses to either continue vibrating, or to reset the feeder by emptying all the spheres back into the hopper.

In another exemplary application of the monitoring subsystems, a machine vision subsystem verifies which spheres are physically held by the deposition head. This step occurs after a pickup operation both before and after the deposition step. By differencing the spheres present at these two steps, it can be inferred which ones were deposited.

The monitoring subsystems can also be utilized to monitor in the drying of selected wetted areas in the embodiments where the printhead utilizes wetting.

It should be noted that different combinations of materials, such as, but not limited to, metallic and nonmetallic materials can be utilized in embodiments of the sister of these teachings. Free-form geometries can be obtained. In one exemplary embodiment, not a limitation of these teachings stainless steel and acrylic spherical components (voxels) are utilized, where the acrylic spherical components and are utilized a sacrificial support material. Upon completion of the assembly, the result is structure is sintered to burn out the acrylic components and bind the stainless steel voxels.

The methods and systems of these teachings can be utilized to manufacture a variety of objects/materials. Manufacturing prototypes can be obtained for complex structures. Other exemplary embodiments, but not an exhaustive list, of objects/materials manufacture by the methods and systems of these teachings are disclosed hereinbelow.

Figures 5E, 5F, 5G:
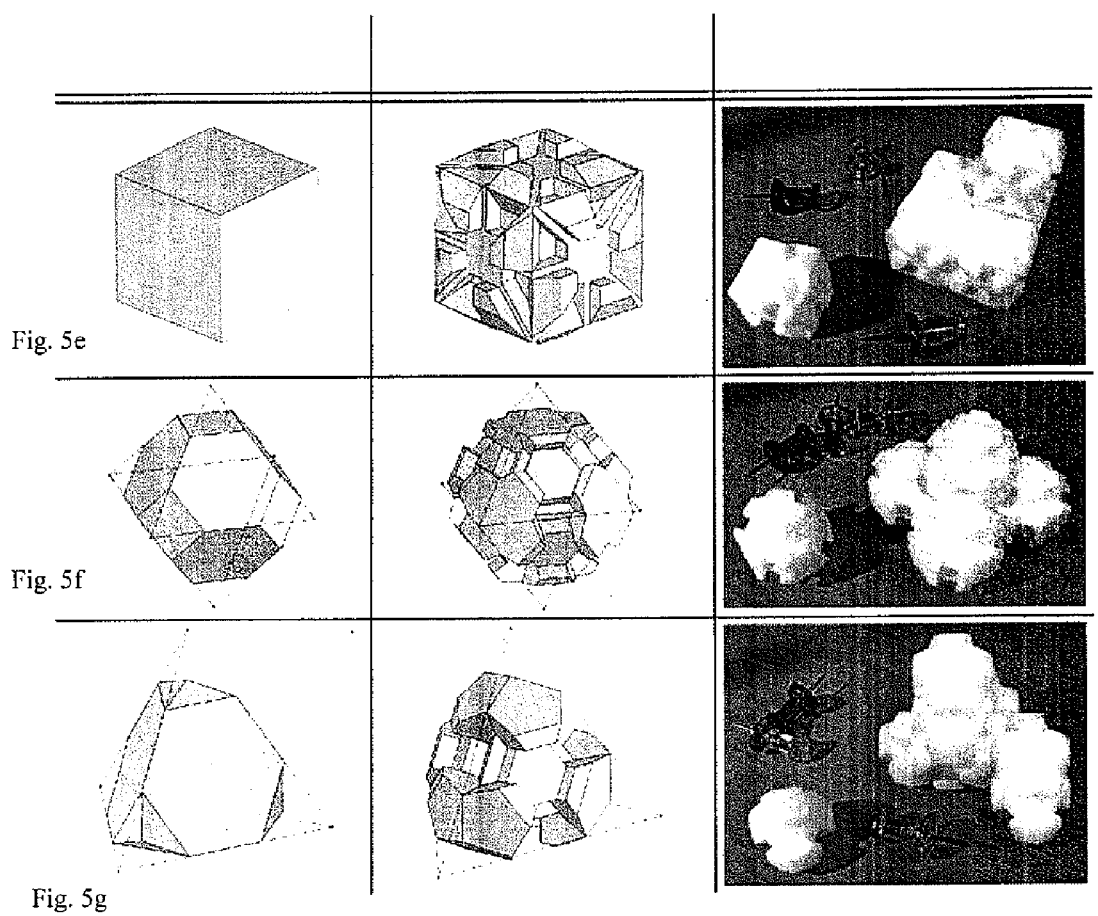
Figure 5H:
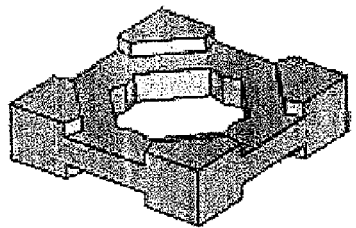
Figure 5I:
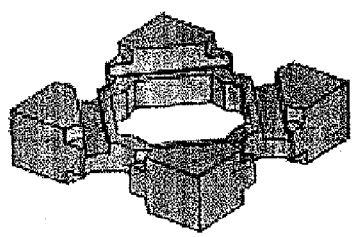
Figure 5J:
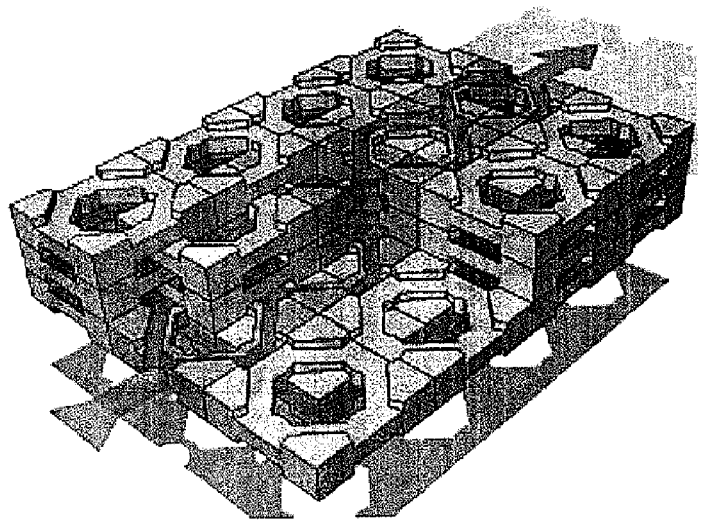
FIGS. 5j-5k are exemplary embodiments of objects manufactured utilizing the method of these teachings.

Electrical networks. The methods and systems of these teachings may be used to make extremely compact, integrated 3D electrical networks and microrobots. With a small library of conductive, insulating, transistor, and other electrical component voxels, compact custom 3D integrated circuits can be fabricated in one step—complete with fluidic cooling channels. By including piezo-electric or shape memory alloy voxels for sensing and actuation, all the components to create a robot in any form are in place, except power. Fluidic networks. A small library of voxels with microfluidic functionality may be developed to enable 3D integrated microfluidic circuits for chemical and biological uses. In one instance, only two voxel types are needed to create arbitrary 3D fluidic networks (see, for example, FIG. 5j utilizing voxels shown in FIGS. 5h and 5i). Compatible valving systems and sensing solutions would allow not only quick fabrication of 3D microfluidics, but eliminate the high overhead and the difficulty of aligning individual layers in traditional microfabrication labs.

Figure 5K:
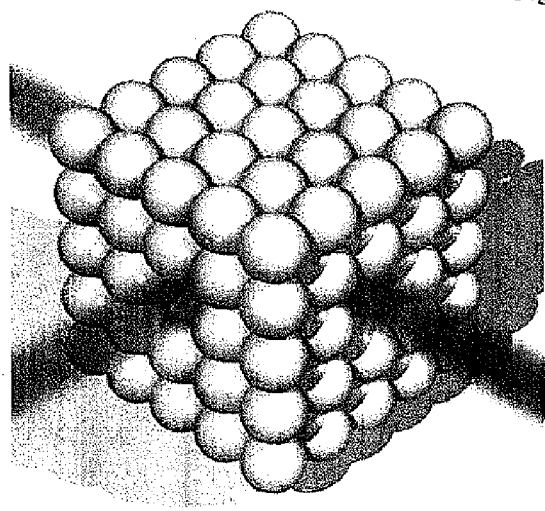

Photonics. The method and systems of these teachings may also benefit those at the forefront of photonics research. Currently, there are many simulations of 3D optical circuits that would usher in a new era of computation, but there is no way to readily produce them. In general, optical circuits are constructed by arbitrary regular placement of high and low optical index elements within a larger matrix. Voxels (order 1,000 mm) could be used to verify these properties with microwaves, and as the scale of voxels approaches the wavelength of visible light (order: 0.5 mm), the methods and systems of these teachings may provide the ability to create optical circuits 9 see, for example, FIG. 5k).

Smart voxels: Voxels do not need to consist of a single material; a voxel could be any microscale tile that can be picked up and laid down according to an electronic blueprint. The flexibility of voxels as fabrication building blocks enables the fabrication methods and systems of these teachings to go beyond the creation of just passive materials. For example, microprocessors, sensors, and actuators could embedded in "smart voxels," allowing fabrication of 3D integrated active devices such as microrobots and 3D circuits. Biological materials shaped into appropriate voxels could permit fabrication of heterogeneous tissue on demand for tissue engineering applications.

Parallel production of incompatible materials: The methods and systems of these teachings allow substantially simultaneous manipulation of a very broad range voxel types using a single printhead. Though the exemplary embodiments of objects and voxels presented herein are relatively simple, the methods and systems of these teachings can be utilized to obtain tunable material properties.

It should be noted that analysis indicates that the error in the dimensions of a object manufacture by the methods and systems of these teachings grows more slowly than in proportion to its size. This sub-linear error scaling is due to the fact that voxel imprecisions tend to cancel each other out.

Although the invention has been described with respect to various embodiments, it should be realized these teachings are also capable of a wide variety of further and other embodiments within the spirit and scope of the appended claims.

What is claimed is:

1. A method for manufacturing object/materials, and the method comprising the steps of:
   (a) arranging, in a predetermined arrangement, predetermined components in a predetermined area;
   (b) selectively removing at least two of the arranged predetermined components, the selectively removing occurring substantially simultaneously and according to a predetermined removal prescription; the selectively removing occurring, by operatively attaching said at least two of the arranged predetermined components to a printhead and displacing the printhead from the predetermined area; and
   (c) substantially simultaneously placing the selectively removed components at a predetermined location according to a predetermined placement prescription;
   each component being a prefabricated physical instantiation of a three-dimensional pixel;
   a shape of said each component being a geometrical shape having a predetermined volume.

2. The method of claim 1 further comprising the steps of:
   selectively removing one of the arranged predetermined first type components; and
   placing the one selectively removed component at a predetermined location according to a predetermined placement prescription.

3. The method of claim 1 wherein the step of arranging predetermined components comprises the step of arranging predetermined components by self-assembly.

4. The method of claim 3 wherein, in the step of arranging predetermined components by self-assembly, self-assembly is achieved by gravity and vibration.

5. The method of claim 3 wherein, in the step of arranging predetermined components by self-assembly, self-assembly is achieved utilizing forces selected from the group consisting of capillary forces and electrostatic forces.

6. The method of claim 1 wherein the step of arranging predetermined components comprises the step of arranging predetermined components by at least one of manual placing, a pick and place robot, settling of components into area indentations, floating components over capillary attraction points or hopper feeds into a conveyer belt.

7. The method of claim 1 wherein the predetermined components comprise substantially spherical components.

8. The method of claim 1 wherein the predetermined components comprise components selected from the group consisting of cylindrical components having a cross-sectional area selected from an equilateral triangle, a rectangle, a diamond, a hexagon, an irregular two-dimensional and tessellating shape, and interlocking areas comprised of a combination of the above, a rectangular prism, a truncated tetrahedron or a truncated octahedron.

9. The method of claim 1 further comprising the step of monitoring the arranging of the predetermined components.

10. The method of claim 1 further comprising the step of monitoring the selectively removing the at least two arranged predetermined components.

11. The method of claim 1 further comprising the step of monitoring the substantially simultaneously placing of the selectively removed predetermined components.

12. The method of claim 1 further comprising the step of repeating steps (a), (b), (c) until an object/material is completed.

13. An object/material manufactured by the method of claim 1.

14. The method of claim 1 wherein an object/material comprises a predetermined number of layers and a predetermined number of types of predetermined components, further comprising the steps of:
(1) repeating steps (a) through (c) a number of times equal to at most said predetermined number of types, in order to manufacture each layer of said object/material; and
(2) after manufacture of each of the predetermined number of layers of said object/material is completed, adjusting position of said predetermined location to a position appropriate for the manufacture of a next layer of said object/material.

15. The method of claim 14 further comprising repeating steps (1) and (2) until the object/material is completed.

16. A method for manufacturing object/materials, the method comprising the steps of:
(a) arranging, in a predetermined arrangement, predetermined components in a predetermined area;
(b) selectively removing at least two of the arranged predetermined components, the selectively removing occurring substantially simultaneously and according to a predetermined removal prescription; and
(c) substantially simultaneously placing the selectively removed components at a predetermined location according to a predetermined placement prescription;
each component being a prefabricated physical instantiation of a three-dimensional pixel;
a shape of said each component being a geometrical shape having a predetermined volume;
wherein said predetermined components comprise at least first type components and second type components; steps (a) through (c) being performed with first type components; and wherein the method further comprises the steps of:
(d) arranging, in the predetermined arrangement, predetermined second type components in another predetermined area;
(e) selectively removing at least two of the arranged predetermined second type components, the selectively removing occurring substantially simultaneously and according to a predetermined second type component removal prescription; and
(f) substantially simultaneously placing the selectively removed second type components at a predetermined second type component location according to a predetermined second type component placement prescription.

17. The method of claim 16 further comprising the step of repeating steps (a) thorough (f) until an object/material is completed.

18. The method of claim 16 wherein said second type components comprise sacrificial components.

19. The method of claim 18 further comprising the step of eliminating the substantially simultaneously placed sacrificial components.

20. A system for manufacturing object/materials, the system comprising:
a component arranging subsystem receiving a plurality of components and arranging said plurality of components in a feeder area, one location in an arrangement corresponding to a location of one component from said plurality of components; an assembly head comprising:
a printhead structural subsystem; a surface of said printhead structural subsystem having a plurality of selectively activatable locations,
each selectively activatable location configured to receive a component for deposition at a location in said arrangement; upon activation, one component from said plurality of components being operatively attached to one selectively activated location from said plurality of selectively activatable locations upon disposing said printhead structural subsystem on said plurality of components; said operatively attached component being removed from the arrangement upon displacement of said printhead structural subsystem away from said feeder area; and
an activating subsystem for selectively activating locations from said plurality of selectively activatable locations;
a motion control subsystem controlling motion of said printhead structural subsystem, said motion comprising disposing said printhead structural subsystem on said plurality of components, displacing said printhead structural subsystem away from said feeder area and placing said printhead structural subsystem at a location on a build stage;
each component being a prefabricated physical instantiation of a three-dimensional pixel; a shape of said each component being a geometrical shape having a predetermined volume.

21. The system of claim 20 wherein the component arranging subsystem comprises:
a feeder receptacle receiving said plurality of components; and
a vibration generating subsystem vibrating said feeder receptacle after receiving said plurality of components.

22. The system of claim 20 wherein said assembly head comprises:
a wetting subsystem for substantially uniformly wetting each area of said plurality of selectively activatable locations with a predetermined fluid; said predetermined fluid being selected in order to operatively attach a component to a substantially uniformly wetted area of said plurality selectively activatable locations upon disposing said surface on said plurality of components;
a controllable drying subsystem for selectively drying predetermined areas of said plurality of selectively activatable locations; said predetermined areas selected according to a predetermined component removal prescription.

23. The system of claim 22 wherein said wetting subsystem comprises a container partially filled with said predetermined solution; and wherein said motion control subsystem inserts said printhead structural subsystem into and removes said printhead structural subsystem from said container in order to substantially uniformly wet each indented area.

24. The system of claim 23 wherein said predetermined solution comprises water and detergent.

25. The system of claim 22 wherein said each area is an indented area.

26. The system of claim 20 wherein each component from said plurality of components comprises a substantially spherical component.

27. The system of claim 20 wherein each component from said variety of components comprises a component selected from the group consisting of a cylindrical component having a cross-sectional area selected from an equilateral triangle, a rectangle, a diamond, a hexagon, an irregular two-dimensional and tessellating shape, and an interlocking area comprised of a combination of the above, a rectangular prism, a truncated tetrahedron or a truncated octahedron.

28. The system of claim 20 further comprising a deactivating subsystem; said deactivating subsystem, after said printhead structural subsystem having been placed at said location on the build stage, detaching components operatively attached to said printhead structural subsystem and depositing said detached components on said location at the build stage.

29. The system of claim 28 further comprising a monitoring subsystem monitoring the placing of the detached components.

30. The system of claim 20 further comprising a binder dispensing subsystem dispensing binder on said location at the build stage; wherein, after placing said printhead structural subsystem at said location on the build stage, upon removing said printhead structural subsystem away from the build stage, components operatively attached to said assembly head are detached from said assembly head and deposited on said location at the build stage.

31. The system of claim 20 wherein each component from said plurality of components is an interlocking component; and wherein, after placing said printhead structural subsystem at said location on the build stage, components operatively attached to said printhead structural subsystem interlock with components already disposed on the build stage, said interlocking detaching said operatively attached components; upon removing said printhead structural subsystem away from the build stage, said detached components being deposited on the build stage.

32. The system of claim 20 wherein said plurality of components is selected from a group consisting of final object components and sacrificial components.

33. The system of claim 20 further comprising a monitoring subsystem monitoring the arranging of said plurality of components.

34. The system of claim 20 further comprising a monitoring subsystem monitoring the removing of operatively attached components.

35. A system for manufacturing object/materials, the system comprising:
a component arranging subsystem receiving a plurality of components and arranging said plurality of components in a feeder area, one location in an arrangement corresponding to a location of one component from said plurality of components; an assembly head comprising:
a printhead structural subsystem; a surface of said printhead structural subsystem having a plurality of selectively activatable locations,
each selectively activatable location corresponding to a location in said arrangement; upon activation, one component from said plurality of components being operatively attached to one selectively activated location upon disposing said printhead structural subsystem on said plurality of components; said operatively attached component being removed from the arrangement upon displacement of said printhead structural subsystem away from said feeder area; and
an activating subsystem for selectively activating locations from said plurality of selectively activatable locations;
a motion control subsystem controlling motion of said printhead structural subsystem, said motion comprising disposing said printhead structural subsystem on said plurality of components, displacing said printhead structural subsystem away from said feeder area and placing said printhead structural subsystem at a location on a build stage;
each component being a prefabricated physical instantiation of a three-dimensional pixel;
a shape of said each component being a geometrical shape having a predetermined volume;

wherein said assembly head comprises:
a printhead structural subsystem; a surface of said printhead structural subsystem having a plurality of selectively activatable locations, each selectively activatable location being an area corresponding to a location in said arrangement;
a wetting subsystem for substantially uniformly' wetting each area with a predetermined fluid; said predetermined fluid being selected in order to operatively attach a component to a substantially uniformly wetted area upon disposing said surface on said plurality of components;
a controllable drying subsystem for selectively drying predetermined areas; said predetermined areas corresponding to a predetermined component removal prescription; wherein said controllable drying subsystem comprises an optical system projecting onto said surface an image corresponding to said predetermined component removal prescription; an electromagnetic radiation source providing a source for said optical system, a wavelength and intensity of said source being selected in order to substantially dry said predetermined areas corresponding to said predetermined component removal prescription.

36. A system for manufacturing object/materials, the system comprising:
a component arranging subsystem receiving a plurality of components and arranging said plurality of components in a feeder area, one location in an arrangement corresponding to a location of one component from said plurality of components; an assembly head comprising:
a printhead structural subsystem; a surface of said printhead structural subsystem having a plurality of selectively activatable locations, each selectively activatable location corresponding to a location in said arrangement; upon activation, one component from said plurality of components being operatively attached to one selectively activated location upon disposing said printhead structural subsystem on said plurality of components; said operatively attached component being removed from the arrangement upon displacement of said printhead structural subsystem away from said feeder area; and
an activating subsystem for selectively activating locations from said plurality of selectively activatable locations;
a motion control subsystem controlling motion of said printhead structural subsystem, said motion comprising disposing said printhead structural subsystem on said plurality of components, displacing said printhead structural subsystem away from said feeder area and placing said printhead structural subsystem at a location on a build stage;
wherein said assembly head comprises:
a printhead structural subsystem; a surface of said printhead structural subsystems having a plurality of selectively activatable locations, each selectively activatable locations corresponding to a location in said arrangement; and
a charging subsystem substantially providing an electrical charge to predetermined ones of said plurality of selectively activatable locations.

37. The system of claim 36 wherein said charging subsystem comprises:
a corona charging subsystem providing an ionized stream providing electrical charge; and a selective blocking; discharging subsystem preventing electrical charging of predetermined selectively activatable locations.

38. The system of claim 37 wherein said selective blocking/discharging subsystem comprises a mask providing a physical barrier between predetermined selectively activatable locations and said ionized stream; said physical barrier preventing electrical charging of predetermined selectively activatable locations.

39. The system of claim 37 wherein said selective blocking/discharging subsystem comprises an optical subsystem providing electromagnetic radiation directed at predetermined selectively activatable locations; said selectively activatable location being comprised of a material that discharges upon illumination by electromagnetic radiation of a predetermined wavelength and intensity.

40. A printhead for a 3D printer for manufacturing objects/materials, the printhead comprising:
 a printhead structural subsystem;
 a surface of said printhead structural subsystem having a plurality of selectively activatable locations, each to configured to receive a component for deposition at a location in an arrangement;
 a wetting subsystem for substantially uniformly wetting a selectively activatable location from said plurality of selectively activatable locations with a predetermined solution; said predetermined solution being selected in order to operatively attach a component to a substantially uniformly wetted selectively activatable location from said plurality of selectively activatable locations upon disposing said surface on an arranged plurality of components; and
 a controllable drying subsystem for selectively drying predetermined selectively activatable locations; said predetermined selectively activatable locations corresponding to a predetermined component removal prescription;
 each component being a prefabricated physical instantiation of a three-dimensional pixel;
 a shape of said each component having a predetermined volume.

41. The printhead of claim 40 wherein said wetting subsystem comprises a container partially filled with said predetermined solution; and wherein said motion control subsystem inserts said printhead structural subsystem into and removes said printhead structural subsystem from said container in order to substantially uniformly wet each selectively activatable location from said plurality of selectively activatable locations.

42. The printhead of claim 41 wherein said predetermined solution comprises water and detergent.

43. A printhead for a 3D printer for manufacturing objects/materials, the printhead comprising:
 a printhead structural subsystem;
 a surface of said printhead structural subsystem having a plurality of selectively activatable locations, each corresponding to a location in an arrangement;
 a wetting subsystem for substantially uniformly wetting selectively activatable location with a predetermined solution; said predetermined solution being selected in order to operatively attach a component to a substantially uniformly wetted selectively activatable location upon disposing said surface on an arranged plurality of components; and
 a controllable drying subsystem for selectively drying predetermined selectively activatable locations; said predetermined selectively activatable locations corresponding to a predetermined component removal prescription;
 wherein said controllable drying subsystem comprises an optical system projecting onto said surface an image corresponding to said predetermined component removal prescription; an electromagnetic radiation source providing a source for said optical system, a wavelength and intensity of said source being selected in order to substantially dry said predetermined selectively activatable locations corresponding to said predetermined component removal prescription.

44. The printhead of claim 40 wherein each selectively activatable location comprises an indented area.

* * * * *

UNITED STATES PATENT AND TRADEMARK OFFICE
CERTIFICATE OF CORRECTION

PATENT NO.        : 8,996,155 B2
APPLICATION NO.   : 13/055614
DATED             : March 31, 2015
INVENTOR(S)       : Jonathan D. Hiller et al.

It is certified that error appears in the above-identified patent and that said Letters Patent is hereby corrected as shown below:

In the Claims,

In column 16, line 7 (claim 35), "uniformly' wetting" should read -- uniformly wetting --

In column 17, line 1 (claim 37), "blocking; discharging" should read -- blocking/discharging --

In column 17, lines 21-22 (claim 40), "each to configured" should read -- each configured --

Signed and Sealed this
Seventh Day of July, 2015

Michelle K. Lee
*Director of the United States Patent and Trademark Office*